US 8,656,028 B2

(12) United States Patent
Sugaya (10) Patent No.: US 8,656,028 B2
(45) Date of Patent: Feb. 18, 2014

(54) SYSTEM, METHOD, AND PROGRAM FOR COMMUNICATION CONNECTION BY POLLING

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 101 days.

(21) Appl. No.: 13/033,197

(22) Filed: Feb. 23, 2011

(65) Prior Publication Data

US 2012/0131206 A1    May 24, 2012

(30) Foreign Application Priority Data

Nov. 18, 2010  (JP) .................................. 2010-258367

(51) Int. Cl.
*G06F 13/14* (2006.01)

(52) U.S. Cl.
USPC ............ 709/227; 709/228; 709/245; 709/203

(58) Field of Classification Search
USPC .................................. 709/227, 228, 203, 245
See application file for complete search history.

(56) References Cited

U.S. PATENT DOCUMENTS

| | | | | |
|---|---|---|---|---|
| 7,702,739 | B1* | 4/2010 | Cheng et al. ................... | 709/207 |
| 2005/0190769 | A1* | 9/2005 | Smith ......................... | 370/395.2 |
| 2011/0276636 | A1* | 11/2011 | Cheng et al. ................... | 709/206 |
| 2012/0124375 | A1* | 5/2012 | Truskovsky et al. .......... | 713/168 |

OTHER PUBLICATIONS

Remote Support Service. [online], Nippon Telegraph and Telephone East Corporation; 2013.

* cited by examiner

*Primary Examiner* — Kenneth Coulter
(74) *Attorney, Agent, or Firm* — BainwoodHuang (57) ABSTRACT

A communication connection system, a communication connection method, and a communication connection program is capable of establishing push-type communication by a connection request from a server side, rather than a client side, in communication between terminals or a terminal and a server. A polling server 50 periodically conducts polling to a connection server 100 to check if the connection server 100 has received connection request data. The polling server 50 transmits the connection request data 10 to a user terminal 10 when the connection server 100 determines that the connection server 100 has received the connection request data from a support terminal 150. The user terminal 10 connects with the support terminal 150 through the polling server 50 and the connection server 100 by a predetermined communication application regardless of input by a user when the user terminal 10 receives the connection request data.

14 Claims, 5 Drawing Sheets

TERMINAL IDENTIFICATION DATA MANAGEMENT TABLE

| CALLED PHONE NUMBER | POLLING SERVER IP ADDRESS | USER TERMINAL IP ADDRESS |
|---|---|---|
| 0120-XXX-XXX | 2002:0aaa:obbb:··· | 198.0.0.4 |
| 0120-XXX-YYY | 2001:000b:fd00··· | 192.1.3.6 |
| : | : | : |

| EMAIL ADDRESS | POLLING SERVER IP ADDRESS | USER TERMINAL IP ADDRESS |
|---|---|---|
| support@op.co.bb | 2002:0aaa:obbb:··· | 198.0.0.4 |
| support@op.co.bb | 2001:000b:fd00··· | 192.1.3.6 |
| : | : | : |

SYSTEM, METHOD, AND PROGRAM FOR COMMUNICATION CONNECTION BY POLLING

This application is based on and claims the benefit of priority from Japanese Patent Application No. 2010-258367, filed on 18 Nov. 2010, the content of which is incorporated herein by reference.

TECHNICAL FIELD

The present invention relates to a communication connection system, a communication connection method, and a communication connection program for establishing communication between terminals or a terminal and a server connected through a public line network by polling.

BACKGROUND ART

In recent years, communication between a terminal and a server or terminals connected through a public line network, has provided various services. For example, it is known that a remote support service for users who operate a personal computer and electronic equipment is provided via a network such as a public line network. Such a remote support service allows customer support staff to access users' personal computers and electronic equipment directly so as to understand the situation or the problem in the computers and electronic equipment. (For example, see non-patent document 1.)

In such a remote support service, to communicate between a user terminal receiving a support service and a support terminal providing a support service through a public line network, devices having a global address should be required. In other words, the user terminal and the support terminal have only their respective private address assigned to a local area network (hereinafter referred to as "LAN"), so that they cannot communicate with each other through a public line network unless a connection server or a router having a global address mediate their communication. For example, a support terminal is connected with a connection server through a LAN, a user terminal is connected with a router through a LAN, and the connection server and the router are connected through a public line network. In this case, the support terminal and the user terminal can communicate with each other.

Then, the user terminal receiving a support service sends an access request to the support terminal so as to start communication between the support terminal and the user terminal through the connection server and the router.

Non-patent document 1: Remote Support Service. [online]. NIPPON TELEGRAPH AND TELEPHONE EAST CORPORATION, [retrieval on Jul. 22, 2009].

SUMMARY OF INVENTION

In one example of these communication methods, a support terminal transmits an access number to a connection server, and then the connection server stores and transmits the access number to a user terminal through a router. Then, the user terminal displays the received access number. When a user inputs the access number into the user terminal, the user terminal notifies the connection server of the access number through a router. Then, the connection server identifies the support terminal by the access number to allow the support terminal and the user terminal to be connected.

However, as described above, in a user terminal-driven type of communication method, input operation of a user terminal is a starting point to establish communication. For example, when a user is away from his or her user terminal, they are waiting for user's instruction so that customer support staff cannot provide a remote support service. In other words, a server side cannot provide any services unless a client side triggers to establish communication.

An object of the present invention is to provide a communication connection system, a communication connection method, and a communication connection program capable of establishing push-type communication by a connection request from a server side, rather than a client side, in communication between terminals not having a global address or between a terminal not having a global address and a server.

According to a first aspect of the present invention, the system includes: a first system composed of a connection server and a support terminal not having a global address; and a second system composed of a user terminal not having a global address and a polling server, and the first system and the second system are connected through a public line network.

In the system, the connection server includes:
a terminal identification data receiver receiving terminal identification data for identifying a user terminal requesting to connect with the support terminal; and
a connection request receiver receiving connection request data indicating connection request from the support terminal to a user terminal identified by the terminal identification data when the terminal identification data is received, the polling server includes:
a polling transmitter periodically conducting polling to the connection server to check if the connection server has received the connection request data; and
a connection request data transmitter of transmitting the connection request data when the polling transmitter determines that the connection server has received the connection request data, and the user terminal includes a communication bus communicating with the support terminal through the polling server and the connection server by a predetermined communication application when the user terminal receives the connection request data.

According to the first aspect of the present invention,
the system includes: a first system composed of a connection server and a support terminal not having a global address; and a second system composed of a user terminal not having a global address and a polling server, and the first system and the second system are connected through a public line network. In the system, the connection server receives terminal identification data for identifying a user terminal requesting to connect with the support terminal, and receives connection request data indicating connection request from the support terminal to a user terminal identified by the terminal identification data when the terminal identification data is received. The polling server periodically conducts polling to the connection server to check if the connection server has received the connection request data, transmits the connection request data when the polling transmitter determines that the connection server has received the connection request data. The user terminal communicates with the support terminal through the polling server and the connection server by a predetermined communication application when the user terminal receives the connection request data.

Therefore, in communication between a user terminal and a support terminal having a global address, push-type communication can be established by not a client side but a server side to start a communication application.

In categories of the invention, a method and a program have functions and effects similar to those of the system according to the first aspect of the present invention.

According to a second aspect of the present invention, in the system according to the first aspect of the present invention, the terminal identification data is any one of a phone number, an IP address, an email address, cookie information, and user identification.

According to a third aspect of the present invention, in the system according to the first aspect of the present invention, the predetermined communication application is an application to provide a support service from the support terminal to the user terminal.

According to a fourth aspect of the present invention, in the system according to the first aspect of the present invention, the predetermined communication application is an application to allow the support terminal and the user terminal to share a screen to be displayed.

According to a fifth aspect of the present invention, the system includes: a first system composed of a connection server and a server; and a second system composed of a user terminal not having a global address and a polling server, and the first system and the second system are connected through a public line network.

In the system, the connection server includes:

a terminal identification data receiver receiving terminal identification data for identifying a user terminal requesting to connect with the server; and a connection request receiver receiving connection request data indicating connection request for the user terminal when the terminal identification data is received, the polling server includes:

a polling transmitter periodically conducting polling to the connection server to check if the connection server has received the connection request data; and a connection request data transmitter transmitting the connection request data when the polling transmitter determines that the server has received the connection request data, and the user terminal includes a communication bus of communicating with the server through the polling server and the connection server by a predetermined communication method or a predetermined communication application when the user terminal receives the connection request data.

According to the fifth aspect of the present invention, the system includes: a first system composed of a connection server and a server; and a second system composed of a user terminal not having a global address and a polling server, and the first system and the second system are connected through a public line network. In the system, the connection server receives terminal identification data for identifying a user terminal requesting to connect with the server and receives connection request data indicating connection request for the user terminal when the terminal identification data is received. The polling server periodically conducts polling to the connection server to check if the connection server has received the connection request data, and transmits the connection request data when the polling transmitter determines that the server has received the connection request data. The user terminal communicates with the server through the polling server and the connection server by a predetermined communication method or a predetermined communication application when the user terminal receives the connection request data.

Therefore, in communication between a user terminal not having a global address and a server, push-type communication can be established by not a client side but a server side to start a communication application.

In categories of the invention, a method and a program have functions and effects similar to those of the system according to the fifth aspect of the present invention.

According to a sixth aspect of the present invention, in the system according to the fifth aspect of the present invention, the predetermined communication method is a communication method using a virtual private network (hereinafter referred to as "VPN").

According to the present invention, in communication between terminals not having a global address or between a terminal not having a global address and a server, push-type communication can be established by a server side.

DESCRIPTION OF EMBODIMENTS

Hereinafter, a best mode of the present invention will be described with reference to attached drawings. However, this is illustrative only, and the scope of the present invention is not limited thereto.

Communication Connection System

Figure 1:
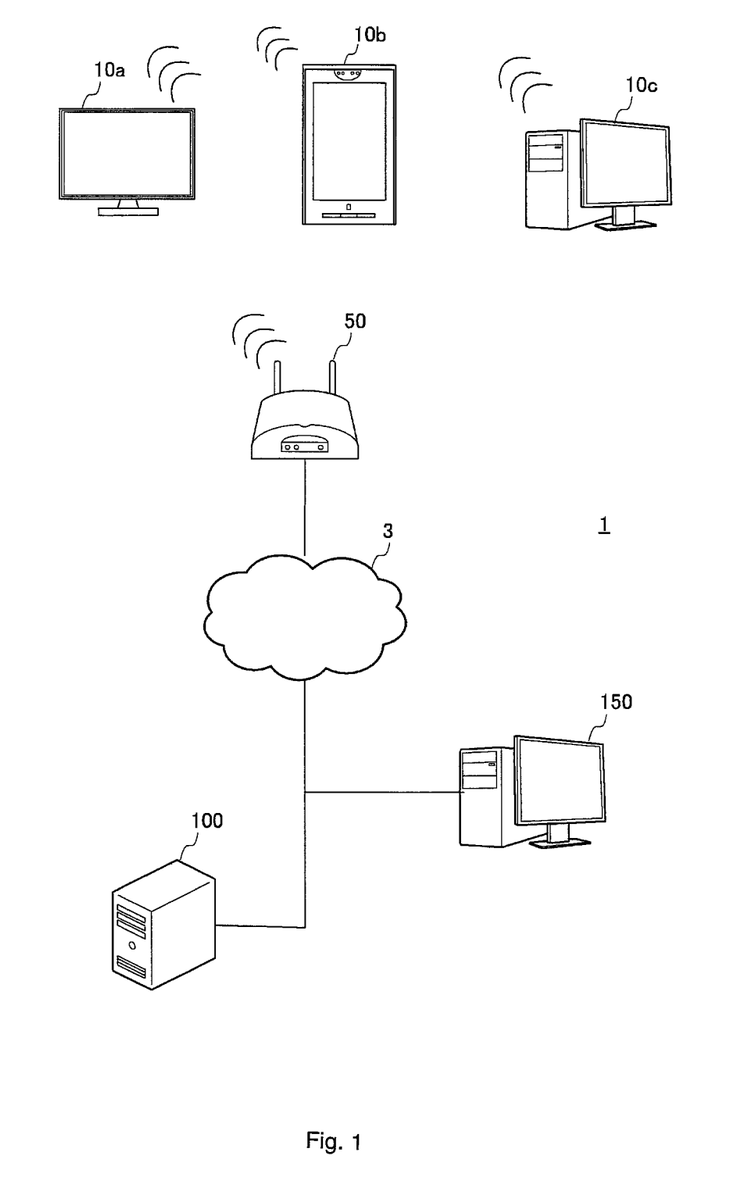
FIG. 1 is a schematic diagram of a communication connection system 1 according to a preferred embodiment of the present invention.

FIG. 1 is a schematic diagram of a communication system 1 according to a preferred embodiment of the present invention. The communication connection system 1 is composed of user terminals 10a-10c (hereinafter simply put "a user terminal 10" in the place of "user terminals 10a-10c"), a polling server 50, a public line network 3 such as an Internet network, a third generation communication network, a fourth generation communication network, and a fixed line, a connection server 100, and a support terminal 150. The user terminal 10 can be communicatably connected with the connection server 100 and the support terminal 150 through the public line network 3.

As shown in FIG. 1, the polling server 50 may be connected to a LAN to function as a gateway for a user terminal 10. However, the polling server 50 may be connected to the public line network 3 without connecting to a LAN of the user terminal 10. In this case, the polling server 50 is called a relay server. Thus, the polling server 50 can communicated with a gateway in a LAN of the user terminal 10. In the present embodiment, communication may be conducted through wired or wireless networks.

As shown in FIG. 1, the support terminal 150 may be connected to a LAN of the connection terminal 100. However, without connecting to such a LAN, the support terminal 150 may communicate with the connection server 100 through the public line network 3. In this case, the connection server 100 can be communicated with a gateway of a LAN of the support terminal 150.

The case in which the connection server 100 and the polling server 50 having a global address can be communicated with each other through the public line network 3 is described herein. In other words, it is apparent that, without global addresses, the connection server 100 and the polling server 50 can communicate with each other through a gateway (with a router function) in a LAN of each server.

Furthermore, it is assumed herein that a global address is not assigned to the user terminal 10 and the support terminal 150. However, it is apparent that, when the user terminal 10 and the support terminal 150 have but do not use a global address, the present example using the polling server 50 can be applied.

The user terminal 10 only has to be a computer terminal with an operating system (hereinafter referred to as "OS"). The user terminal 10 includes information technology devices and electronic equipment with functions described below. For example, the user terminal 10 may be a mobile phone, a smart phone 10b, a complex printer, a television 10a, networking equipment such as a router or a gateway, and a computer 10c. The user terminal 10 may also be white goods such as a refrigerator and a washing machine. The user terminal 10 may also be general information appliances such as a telephone, a netbook terminal, a slate terminal, an electronic book terminal, an electronic dictionary terminal, a portable music player, and a portable player capable of recording and playing back content.

Functions

Figure 2:
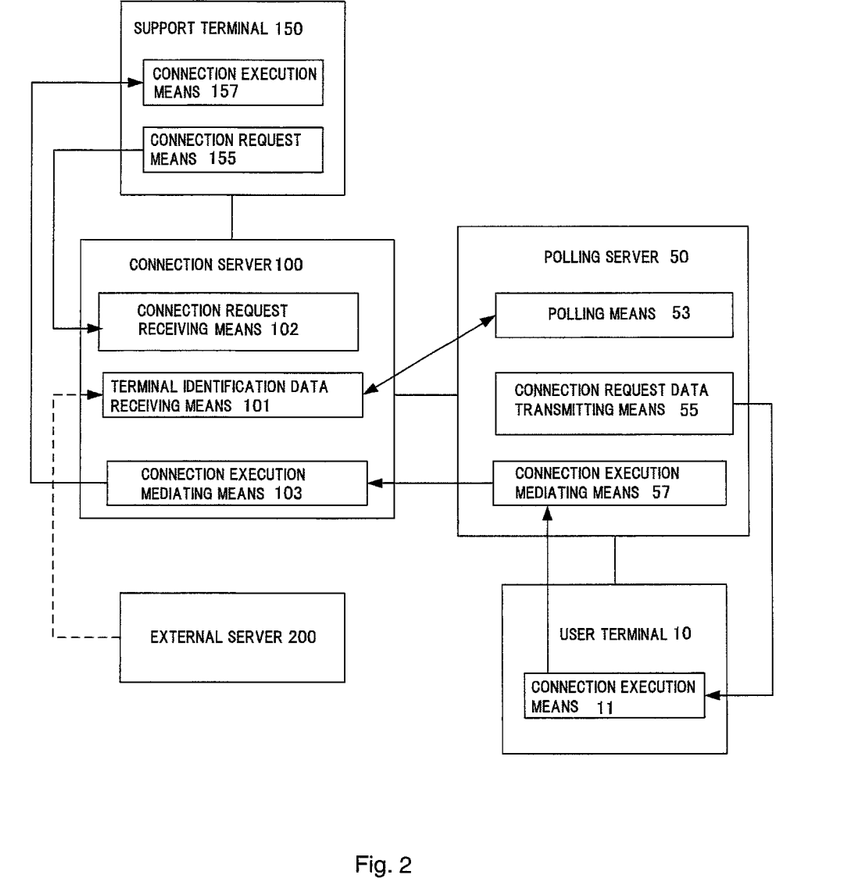
FIG. 2 is a functional block diagram of a support terminal 150, a connection server 100, a polling server 50, and a user terminal 10 according to a preferred embodiment of the present invention.

FIG. 2 is a functional block diagram of a support terminal 150, a connection server 100, a polling server 50, and a user terminal 10, illustrating the relationship between individual functions.

The user terminal 10 and the support terminal 150 include a control unit composed of a central processing unit (hereinafter referred to as "CPU"), a random access memory (hereinafter referred to as "RAM"), and a read only memory (hereinafter referred to as "ROM"), and the like; and a communication unit composed of Wireless Fidelity® or WiFi® enabled device complying with IEEE802.11, a wireless device complying with the IMT-2000 standard such as the third generation mobile communication system, or the like. The communication unit may be composed of a wired device. The user terminal 10 and the support terminal 150 also include an input/output unit having a display unit and the like that display data and images controlled by the control unit, and having a touch panel, a keyboard, and the like that receives input from a user.

In the user terminal 10, the control unit and the communication unit cooperate to achieve a connection execution means 11. In the support terminal 150, the control unit and the communication unit cooperate to achieve a connection execution means 157 and a connection request means 155. The function of each means and the relationship therebetween are described with reference to FIG. 3.

The connection server 100 and the polling server 50 include a control unit composed of a central processing unit (hereinafter referred to as "CPU"), a random access memory (hereinafter referred to as "RAM"), and a read only memory (hereinafter referred to as "ROM"), and the like; and a communication unit composed of Wireless Fidelity® or WiFi® enabled device complying with IEEE802.11, a wireless device complying with the IMT-2000 standard such as the third generation mobile communication system, or the like. The communication unit may be composed of a wired device.

The polling server 50 stores the private address of the user terminal 10 controlled by the polling server 50.

The control unit of the connection server 100 cooperates with its connection unit to achieve a connection request receiving means 102, a terminal identification data receiving means 101, and a connection execution mediating means 103. The control unit of the polling server 50 cooperates with its connection unit to achieve a polling means 53, a connection request data transmitting means 55, and a connection execution mediating means 57. The function of each means and the relationship therebetween are described with reference to FIG. 3.

An external server 200 can communicatably connected with the connection server 100 through the public line network 3 or a LAN. The external server 200 transmits terminal identification data described below to the connection server 100. The terminal identification data receiving means 101 of the connection server 100 receives the terminal identification data.

The First Communication Connection Process

Figure 3:
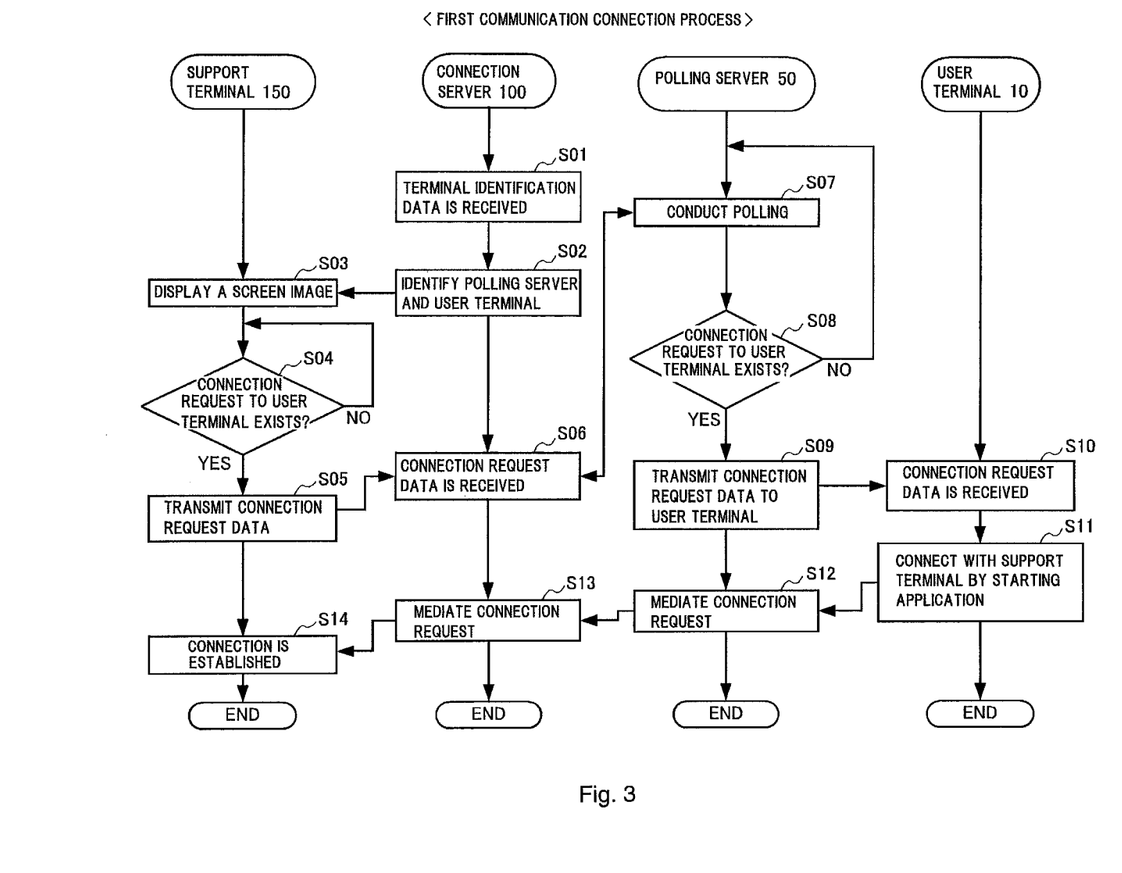
FIG. 3 is a flow chart diagram illustrating a first communication connection process executed by a support terminal 150, a connection server 100, a polling server 50, and a user terminal 10.

FIG. 3 is a flow chart diagram of the first communication connection process executed by a support terminal 150, a connection server 100, a polling server 50, and a user terminal 10.

In this process, a polling means 53 of the polling server 50 periodically conducts polling to check if the connection server 100 has received connection request data (Step S07). The polling is conducted at intervals, for example, every a few seconds. The polling means 53 of the polling server 50 determines by receiving connection request data whether or not connection request from the support terminal 150 to the user terminal 10 exists. The step S07 process is repeated as long as no connection request to the user terminal 10 exists (Step S08: "NO").

First, the terminal identification data receiving means 101 of the connection server 100 receives terminal identification data from an external server 200 (Step S01).

Figure 4:
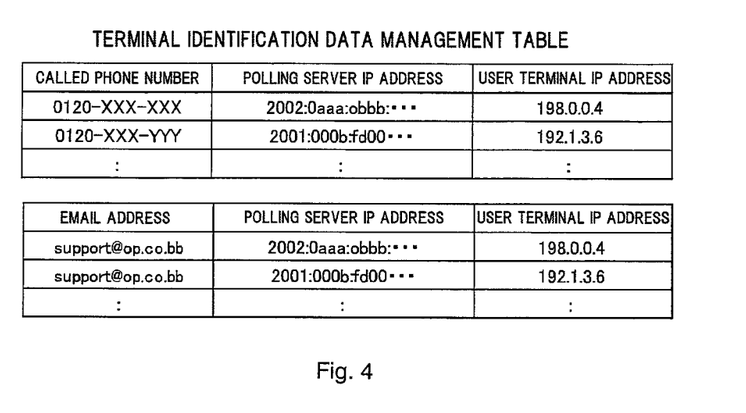
FIG. 4 illustrates a terminal identification data management table.

The terminal identification data is to identify a user terminal, and may be a called phone number, an email address, cookie information, user identification, and the like as shown in the terminal identification data management table of FIG. 4. For example, when a user who uses a user terminal 10 calls a predetermined telephone number to connect with the connection server, the predetermined telephone number becomes a called phone number.

In other words, a user who operates a user terminal 10 requires a support service. The user calls a predetermined support telephone number to receive a support service. Then, the external server 200 displays the predetermined telephone number provided uniquely for each user on his or her user terminal 10, as a telephone number to be supported. When the user calls the unique support telephone number displayed on this user terminal 10, a switch or the external server 200 receives the call. This unique support telephone number called is transmitted from a switch or the external server 200 to the connection server 100 as the called phone number of terminal identification data.

The called phone number may be a calling phone number called from a user terminal 10 and the like. In this case, in the terminal identification data management table of FIG. 4, the calling phone number is preliminarily related from the IP addresses of a polling server and a user terminal, and the like. A switch or the external server 200 transmits the calling phone number at the time of receiving a call as the terminal identification data, to the connection server 100.

The terminal identification data may also be an email address. In this case, the external server 200 has the function of a mail server. As shown in FIG. 4, in the terminal identification data management table, an email address of a user who sent email as a source email address is preliminarily related from the IP addresses of a polling server and a user terminal, and the like. The external server 200 transmits the source email address to the connection server 100 as the terminal identification data.

The terminal identification data may also be cookie information identifying an accessed web browser. In this case, in the terminal identification data management table of FIG. 4, cookie information of a web browser activated on a user terminal 10 is preliminarily related from the IP addresses of a polling server and a user terminal, and the like. A web server, which is the external server 200, transmits received transmit cookie information to the connection server 100 as the terminal identification data.

The terminal identification data may also be a user identification authenticated by a Web browser and the like. In this case, in the terminal identification data management table, a user identification data is preliminarily related from the IP addresses of a polling server and a user terminal, and the like, The external server 200 functioning as an authentication server transmits user identification that has authenticated by a web server and the like to the connection server 100 as the terminal identification data.

Even if the terminal identification data is a predetermined password provided for each user terminal 10, the password can be processed in a similar way to the above-mentioned user identification.

Then, the connection server 100 identifies the polling server 50 and the user terminal 10 based on an association such as the terminal identification data management table shown in FIG. 4 (Step S02). To identify the polling server 50 and the user terminal 10 is to identify the IP addresses of the polling server 50 and the user terminal 10.

In the terminal identification data management table, a called phone number, a polling server IP address (the global IP address of a polling server), and a user terminal IP address (the private IP address of a user terminal) are associated. As described above herein, the terminal identification data may be an email address, cookie information, a user identity, and the like instead of a called phone number.

Then, the connection server 100 notifies the support terminal 150 of receipt of the terminal identification data, and the support terminal 150 displays a screen image, an icon or characters, and the like that are received from the user terminal 10 identified by the terminal identification data (Step S03). In this case, as the support terminal 150 to which receipt of the terminal identification data is notified, there may be a plurality of support terminals 150 connected with the connection server 100 or a part of support terminals 150 selected by the connection server 100.

Figure 5:
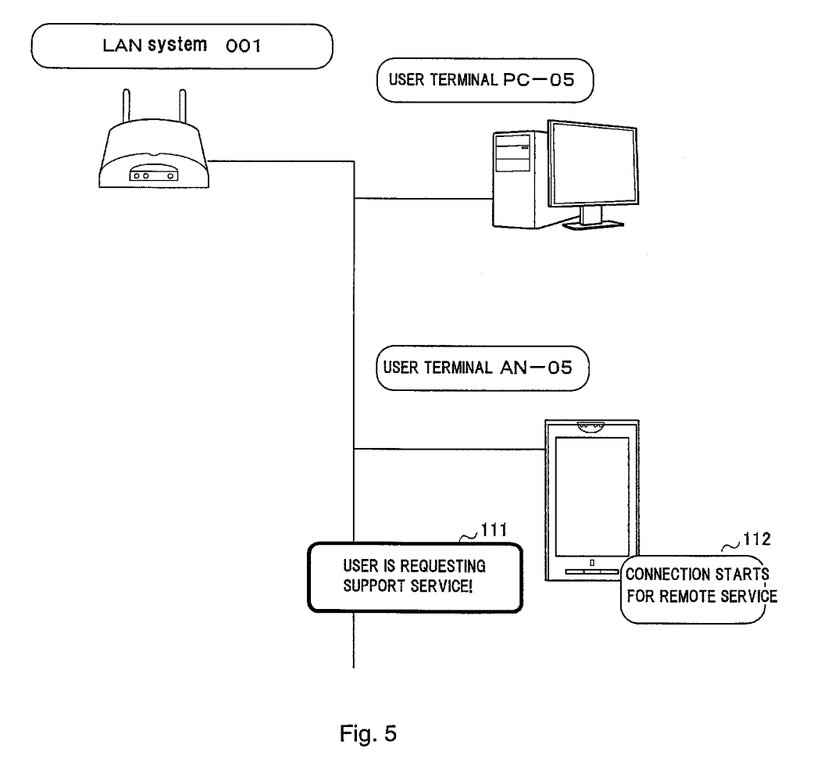
FIG. 5 illustrates a screen image displayed on a support terminal 150.

FIG. 5 illustrates a screen image displayed on a support terminal 150 at this point. In the example of FIG. 5, the user terminal 10 identified by terminal identification data is a user terminal "AN-05". In a screen image displayed on a support terminal 150, the instruction 'USER IS REQUESTING SUPPORT SERVICE' 111 is displayed. This is displayed for the purpose of prompting customer service staff who operate the support terminal 150 to start connection for providing a remote service. When a user presses an icon 112 of connection start for a remote support service, a support terminal 150 determines that connection request for the user terminal "AN-05" has existed.

If a connection request means 155 of the support terminal 150 determines that connection request for the user terminal 10 has existed (Step S04: "YES"), the connection request means 155 transmits the connection request data to the connection server 100 (Step S05). If the connection request means 155 of the support terminal 150 determines that connection request for the user terminal 10 has not existed (Step S04: "NO"), the process is waiting in the step S04.

The connection request data is data in which the connection server 100 requests the user terminal 10 identified by the terminal identification data to connect with the support terminal 150. The connection request data does not necessarily has to include the IP address of the user terminal 10 identified by the terminal identification data. However, the connection request data includes the IP address of the support terminal 150 that has requested for connection.

The connection request receiving means 102 of the connection server 100 receives connection request data (Step S06). As described above, the polling server 50 periodically check if the connection server 100 has received the connection request data. Thus, a polling means 53 of the polling server 50 determines that the connection server 100 has received the connection request data (Step S07).

The polling means 53 of the polling server 50 determines whether or not connection request to the user terminal 10 exists. If the connection server 100 determines that the connection server 100 has received the connection request data, the process is moved to the step S08 (Step S08: "YES"). At this point, the IP address of the polling server 50 has been identified by the terminal identification data at the step S02, so that each polling server 50 can determine that connection request is for the user terminal 10 controlled by this polling server 50.

In the step S09, a connection request data transmitting means 55 of the polling server 50 transmits the connection request data to the user terminal 10 identified by the terminal identification data. Since the private address of the user terminal 10 is identified by the connection server 100 in the step S02, so that the polling server 50 can identify the user terminal 10 to transmit the connection request data to this user terminal 10.

The identified user terminal 10 (in the example of FIG. 5, "User terminal AN-05") receives connection request data (Step S10). Then, a connection execution means 11 of the user terminal 10 requests connection with the support terminal 150 that requested connection (Step S11) by the start of connected application (regardless of operation by a user who operates the user terminal 10).

A connection execution mediating means 57 of the polling server 50 connects with the connection server 100 having a global address to mediate connection request from the user terminal 10 (Step S12). In response to this, since a connection execution mediating means 103 of the connection server 100 identifies the support terminal 150 by the stored IP address of the support terminal 150, and then connects with a connection execution means 157 of the identified support terminal 150 (Step S13).

The connection execution means 157 of the support terminal 150 establishes connection with the user terminal 10 for a remote support service (Step S14). The remote support service is started by remote control from the support terminal 150 to the user terminal 10 and execution of a communication application to provide a sharing service to allow the both terminals to share screen data displayed on each other.

The Second Communication Connection Process

Figure 6:
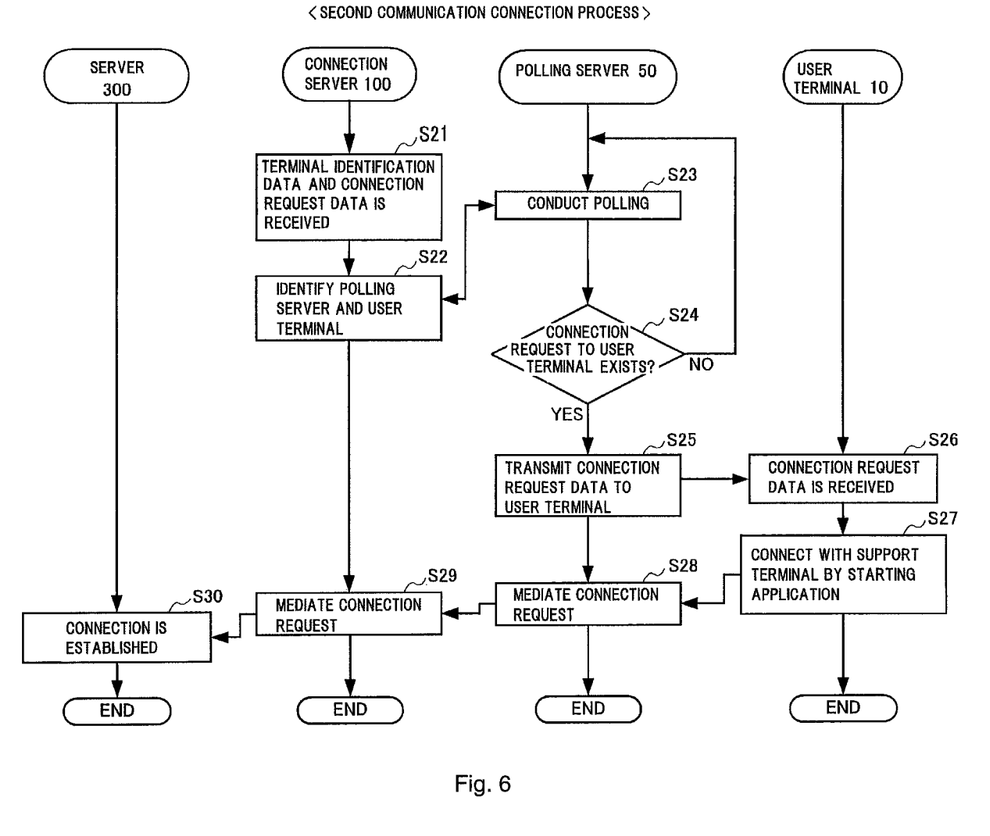
FIG. 6 is a flow chart diagram illustrating a second communication connection process executed by a server 300, a connection server 100, a polling server 50, and a user terminal 10.

FIG. 6 is a flow chart diagram of a second communication connection process executed by a server 300, a connection server 100, a polling server 50, and a user terminal 10. The second communication connection process is different from the first communication connection process in that a communication connection method in which not only an application to provide a support service from the support terminal 150 but also a user terminal 10 starts connection with a general server 300. This communication connection may use VPN to establish communication.

In this process, the polling means 53 of the polling server 50 periodically conducts polling to check if the connection server 100 has received terminal identification data (Step S23).

First, a terminal identification data receiving means 101 of the connection server 100 receives terminal identification data and connection request data from an external server 200 (Step S21). The terminal identification data is the same as that of the first communication connection process. The second communication connection process is different from the first communication connection process in that the connection request data is generated by the external server 200 when connection request from the user terminal 10 exists by receiving a call or email, indicating that the user terminal 10 requests connection with the server 300.

Then, the connection server 100 identifies the polling server 50 and the user terminal 10 based on an association such as the terminal identification data management table shown in FIG. 4 (Step S22).

The polling means 53 of the polling server 50 determines whether or not connection request to the user terminal 10 exists. If the connection server 100 determines that the connection server 100 has received the connection request data from the user terminal, the process is moved to the step S25 (Step S25: "YES").

In the step S25, a connection request data transmitting means 55 of the polling server 50 transmits the connection request data to the user terminal 10 identified by the terminal identification data.

The identified user terminal 10 (in the example of FIG. 5, "User terminal AN-05") receives connection request data (Step S26). Then, a connection execution means 11 of the user terminal 10 requests connection with the server 300 that requested connection (Step S27) by the start of a connected application (regardless of operation by a user who operates the user terminal 10).

A connection execution mediating means 57 of the polling server 50 connects with the connection server 100 having a global address to mediate connection request from the user terminal 10 (Step S28). In response to this, since a connection execution mediating means 103 of the connection server 100 identifies the server 300 by the stored IP address of the support terminal 150, and then connects with the identified server 300 (Step S29).

The server 300 establishes communication connection with the user terminal 10 (Step S30). At this point, an application for VPN communication connection may be started to enable VPN communication.

To achieve the means and functions as described above, a computer (including a CPU, an information processor, and various terminals) reads and executes a predetermined program. For example, an application program is provided in forms recorded in a computer-readable record medium such as a flexible disk, a CD (CD-ROM etc.), and a DVD (a DVD-ROM and a DVD-RAM, etc.). In this case, a computer reads an application program from a record medium, forwards the application program to internal or external storage to store the application program therein, and executes the application program. For example, the application program may be preliminarily recorded in memory (a record media) such as a magnetic disk, an optical disk, and a magnetic optical disk, and then provided from memory to a computer through a communication line.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

REFERENCE SIGNS LIST

1 Communication Connection System
3 Public Line Network
10 User Terminal
50 Polling Server
100 Connection Server
150 Support Terminal

The invention claimed is:
1. A communication connection system, comprising:
a first system composed of (i) a connection server and (ii) a support terminal not having a global address; and
a second system composed of (i) a user terminal not having a global address and (ii) a polling server, the first system and the second system being connected through a public line network, wherein
the connection server includes:
a terminal identification data receiver receiving terminal identification data for identifying a user terminal requesting to connect with the support terminal, and
a connection request receiver receiving connection request data indicating connection request from the support terminal to a user terminal identified by the terminal identification data when the terminal identification data is received,
the polling server includes:
a polling transmitter periodically conducting polling to the connection server to check if the connection server has received the connection request data, and
a connection request data transmitter transmitting the connection request data when the polling transmitter determines that the connection server has received the connection request data, and
the user terminal includes a communication bus communicating with the support terminal through the polling server and the connection server by a predetermined communication application when the user terminal receives the connection request data;
wherein the communication connection system is constructed and arranged to:
send a user of the user terminal a message providing a unique telephone number to be called to obtain support;
store the unique telephone number, along with other unique telephone numbers, in a table on an authentication server, the table associating each telephone number with a respective public IP address of a polling server and with a respective private IP address of a user terminal;
receive a telephone call from the user to the unique telephone number previously sent to the user; and
access the table to identify the public IP address of the polling server and the private IP address of the user terminal associated with the called telephone number;

wherein the terminal identification data receiver receiving, by the connection server, terminal identification data includes receiving the public IP address of the polling server and the private IP address of the user terminal identified from the table.

2. The system according to claim 1, wherein the terminal identification data is any one of a phone number, an IP address, an email address, cookie information, and a user identification.

3. The system according to claim 1, wherein the predetermined communication application is an application to provide a support service from the support terminal to the user terminal.

4. The system according to claim 1, wherein the predetermined communication application is an application to allow the support terminal and the user terminal to share a screen to be displayed.

5. The system according to claim 1, wherein the communication connection system is further constructed and arranged to, in response to receiving the telephone call from the user:
send connection request data from the support terminal to the connection server to initiate a push-type communication between the support terminal and the user terminal;
send the connection request data from the connection server to the polling server, and
send the connection request data from the polling server to the user terminal.

6. A system comprising:
a first system composed of a connection server and a server; and
a second system composed of (i) a user terminal not having a global address and (ii) a polling server,
the first system and the second system being connected through a public line network, wherein
the connection server includes:
a terminal identification data receiver receiving terminal identification data for identifying a user terminal requesting to connect with the server; and
a connection request receiver receiving connection request data indicating connection request for the user terminal when the terminal identification data is received,
the polling server includes:
a polling transmitter periodically conducting polling to the connection server to check if the connection server has received the connection request data; and
a connection request data transmitter transmitting the connection request data when the polling transmitter determines that the server has received the connection request data, and
the user terminal includes a communication bus communicating with the server through the polling server and the connection server by a predetermined communication method or a predetermined communication application when the user terminal receives the connection request data,
and wherein the system is constructed and arranged to:
send a user of the user terminal a message providing a unique telephone number to be called to obtain support;
store the unique telephone number, along with other unique telephone numbers, in a table on an authentication server, the table associating each telephone number with a respective public IP address of a polling server and with a respective private IP address of a user terminal;
receive a telephone call from the user to the unique telephone number previously sent to the user; and
access the table to identify the public IP address of the polling server and the private IP address of the user terminal associated with the called telephone number;
wherein the terminal identification data receiver receiving, by the connection server, terminal identification data includes receiving the public IP address of the polling server and the private IP address of the user terminal identified from the table.

7. The system according to claim 5, the predetermined communication method is a communication method using a virtual private network (VPN).

8. The system according to claim 6, wherein the system is further constructed and arranged to, in response to receiving the telephone call from the user:
send connection request data from the support terminal to the connection server to initiate a push-type communication between the support terminal and the user terminal;
send the connection request data from the connection server to the polling server, and
send the connection request data from the polling server to the user terminal.

9. A method of connecting a first system composed of (i) a connection server and (ii) a support terminal not having a global address with a second system composed of (i) a user terminal not having a global address and (ii) a polling server through a public line network, the method comprising the steps of:
by the connection server:
receiving terminal identification data for identifying a user terminal requesting to connect with the support terminal by the connection server; and
receiving connection request data indicating connection request from the support terminal to a user terminal identified by the terminal identification data when the terminal identification data is received;
by the polling server:
conducting polling to the connection server to check if the connection server has received the connection request data; and
transmitting the connection request data if, in the step of conducting polling, the connection server has received the connection request data, and
by the user terminal: communicating with the support terminal through the polling server and the connection server by a predetermined communication application when the user terminal receives the connection request data,
and wherein the method further comprises:
sending a user of the user terminal a message providing a unique telephone number to be called to obtain support;
storing the unique telephone number, along with other unique telephone numbers, in a table on an authentication server, the table associating each telephone number with a respective public IP address of a polling server and with a respective private IP address of a user terminal;
receiving a telephone call from the user to the unique telephone number previously sent to the user; and
accessing the table to identify the public IP address of the polling server and the private IP address of the user terminal associated with the called telephone number;
wherein receiving, by the connection server, terminal identification data includes receiving the public IP address of the polling server and the private IP address of the user terminal identified from the table.

10. The method of claim 9,
wherein the polling server has a public IP address and the user terminal has a private IP address, and
wherein the connection server has a public IP address and the support terminal has a private IP address.

11. The method of claim 10,
wherein the terminal identification data includes the public IP address of the polling server and the private IP address of the user terminal, and
wherein the connection request data includes the private IP address of the support terminal.

12. The method of claim 9, further comprising, in response to receiving the telephone call from the user:
sending connection request data from the support terminal to the connection server to initiate a push-type communication between the support terminal and the user terminal;
sending the connection request data from the connection server to the polling server, and
sending the connection request data from the polling server to the user terminal.

13. A computer program product for use in a system having a first system composed of (i) a connection server and (ii) a support terminal not having a global address and a second system composed of (i) a user terminal not having a global address and (ii) a polling server, the computer program product comprising:
a non-transitory computer usable medium having a set of instructions physically embodied therein; the set of instructions including:
computer readable program code causing the first system and the second system to connect with each other through a public line network;
computer readable program code causing the connection server to receive terminal identification data for identifying a user terminal requesting to connect with the support terminal by the connection server; and receive connection request data indicating connection request from the support terminal to a user terminal identified by the terminal identification data when the terminal identification data is received,
computer readable program code causing the polling server to conduct polling to the connection server to check if the connection server has received the connection request data; and transmit the connection request data if, in the instruction of conducting polling, the connection server has received the connection request data, and
computer readable program code causing the user terminal to communicate with the support terminal through the polling server and the connection server by a predetermined communication application when the user terminal receives the connection request data,
the set of instructions further including computer readable program code for:
sending a user of the user terminal a message providing a unique telephone number to be called to obtain support;
storing the unique telephone number, along with other unique telephone numbers, in a table on an authentication server, the table associating each telephone number with a respective public IP address of a polling server and with a respective private IP address of a user terminal;
receiving a telephone call from the user to the unique telephone number previously sent to the user; and
accessing the table to identify the public IP address of the polling server and the private IP address of the user terminal associated with the called telephone number;
wherein receiving, by the connection server, terminal identification data includes receiving the public IP address of the polling server and the private IP address of the user terminal identified from the table.

14. The computer program product of claim 13, wherein the set of instructions further includes computer readable program code for, in response to receiving the telephone call from the user:
sending connection request data from the support terminal to the connection server to initiate a push-type communication between the support terminal and the user terminal;
sending the connection request data from the connection server to the polling server, and
sending the connection request data from the polling server to the user terminal.

* * * * *